(12) United States Patent
Ooba et al.

(10) Patent No.: US 10,655,630 B2
(45) Date of Patent: May 19, 2020

(54) BYPASS DUCT FAIRING FOR LOW BYPASS RATIO TURBOFAN ENGINE AND TURBOFAN ENGINE THEREWITH

(71) Applicant: IHI Corporation, Koto-ku (JP)

(72) Inventors: Yoshinori Ooba, Tokyo (JP); Kazuhiro Suzuki, Tokyo (JP); Takeshi Isokawa, Tokyo (JP)

(73) Assignee: IHI Corporation, Koto-ku (JP)

( * ) Notice: Subject to any disclaimer, the term of this patent is extended or adjusted under 35 U.S.C. 154(b) by 487 days.

(21) Appl. No.: 15/284,119

(22) Filed: Oct. 3, 2016

(65) Prior Publication Data

US 2017/0022996 A1 Jan. 26, 2017

Related U.S. Application Data

(63) Continuation of application No. PCT/JP2015/072899, filed on Aug. 13, 2015.

(30) Foreign Application Priority Data

Sep. 10, 2014 (JP) ................ 2014-184253

(51) Int. Cl.
*F04D 27/00* (2006.01)
*F02K 3/06* (2006.01)
*F01D 25/24* (2006.01)

(52) U.S. Cl.
CPC ........... *F04D 27/009* (2013.01); *F01D 25/24* (2013.01); *F02K 3/06* (2013.01)

(58) Field of Classification Search
CPC . F02K 3/02; F02K 3/06; F04D 27/009; F04D 29/40; F04D 29/4226; F01D 25/26; F05D 2240/14
See application file for complete search history.

(56) References Cited

U.S. PATENT DOCUMENTS

| 4,175,384 | A | | 11/1979 | Wagenknecht et al. |
| 4,221,114 | A | * | 9/1980 | Wilde ............... F02C 9/20 60/233 |
| 5,048,286 | A | | 9/1991 | Stransky et al. |
| 5,680,754 | A | * | 10/1997 | Giffin ............... F02K 3/02 60/226.1 |
| 6,217,277 | B1 | | 4/2001 | Liu et al. |
| 7,765,789 | B2 | * | 8/2010 | Johnson ............ F01D 17/162 60/226.1 |
| 9,915,149 | B2 | * | 3/2018 | Rice ............... F01D 5/145 |

(Continued)

FOREIGN PATENT DOCUMENTS

| JP | 54-27613 | 3/1979 |
| JP | 58-107842 | 6/1983 |

(Continued)

OTHER PUBLICATIONS

Extended European Search Report dated Oct. 25, 2017 in Patent Application No. 15840659.5.

(Continued)

*Primary Examiner* — Kenneth J Hansen
*Assistant Examiner* — Maranatha Boardman
(74) *Attorney, Agent, or Firm* — Oblon, McClelland, Maier & Neustadt, L.L.P.

(57) ABSTRACT

A fairing installed in a bypass duct defined between an outer casing and an inner casing around an axis of a turbofan engine to make compressed air bypass a low pressure compressor is comprised of a fore section elongated aftward from the inner casing at an inlet of the bypass duct and running along an internal periphery of the outer casing; and an aft section elongated aftward in succession to the fore section and curved in a direction getting away from the internal periphery so as to increase an area of a flow path toward an aft end of the aft section, the whole of the aft section being curved.

9 Claims, 4 Drawing Sheets

(56) References Cited

U.S. PATENT DOCUMENTS

| | | |
|---|---|---|
| 2005/0072158 A1 | 4/2005 | Christopherson |
| 2007/0144139 A1 | 6/2007 | Kawamoto et al. |
| 2008/0095611 A1 | 4/2008 | Storage et al. |
| 2008/0230651 A1 | 9/2008 | Porte |
| 2011/0011058 A1 | 1/2011 | Clemen |
| 2011/0120082 A1 | 5/2011 | Giffin et al. |
| 2012/0034064 A1 | 2/2012 | Nanda et al. |
| 2013/0104522 A1 | 5/2013 | Kupratis |
| 2013/0195605 A1 | 8/2013 | Robertson et al. |
| 2013/0266419 A1* | 10/2013 | Richardson ............. F01D 17/00 415/1 |
| 2015/0104324 A1 | 4/2015 | Yagi et al. |
| 2015/0128562 A1 | 5/2015 | Kusuda et al. |

FOREIGN PATENT DOCUMENTS

| | | |
|---|---|---|
| JP | 61-19820 | 5/1986 |
| JP | 6-102991 | 12/1994 |
| JP | 2000-320306 | 11/2000 |
| JP | 2001-50110 | 2/2001 |
| JP | 3196426 | 8/2001 |
| JP | 2003-511598 | 3/2003 |
| JP | 2005-113919 | 4/2005 |
| JP | 2006-161653 | 6/2006 |
| JP | 2009-510304 | 3/2009 |
| JP | 4559180 | 10/2010 |
| JP | 2012-36891 | 2/2012 |
| JP | 2012-117544 | 6/2012 |
| JP | 2013-155674 | 8/2013 |
| JP | 2013-155735 | 8/2013 |
| JP | 2014-25395 | 2/2014 |

OTHER PUBLICATIONS

International Search Report dated Oct. 27, 2015 in PCT/JP2015/072899, filed on Aug. 13, 2016 (with English Translation).
Written Opinion dated Oct. 27, 2015 in PCT/JP2015/072899, filed on Aug. 13, 2016.

* cited by examiner

BYPASS DUCT FAIRING FOR LOW BYPASS RATIO TURBOFAN ENGINE AND TURBOFAN ENGINE THEREWITH

CROSS-REFERENCE TO RELATED APPLICATIONS

This application is a Continuation Application of PCT International Application No. PCT/JP2015/072899 (filed Aug. 13, 2015), which is in turn based upon and claims the benefit of priority from Japanese Patent Application No. 2014-184253 (filed Sep. 10, 2014), the entire contents of which are incorporated herein by reference.

BACKGROUND

Technical Field

The disclosure herein relates to a fairing installed in a bypass duct and particularly to a fairing installed in a bypass duct for rectifying a bypass flow in a low bypass ratio turbofan engine and a turbofan engine therewith.

Description of the Related Art

In a turbojet engine, hot gas flow generated by a combustor, if ejected aftward with no change, has excessive velocity relative to the flight speed, and therefore generates great resistance to the ambient air. This leads to little expectation of high thrust efficiency particularly in low flight speeds. This problem may be solved by conducting part of air flow generated by a fan or a compressor thereof to bypass a core engine into a bypass duct and then ejecting it aftward. An engine of this type is referred to as a turbofan engine, which is well known because the bypass flow having proper velocity relative to the ambient air prominently improves thrust efficiency.

The ratio of the amount of air flowing into the bypass duct to the amount of air flowing into the core engine is referred to as a bypass ratio. In engines used for aviation up to subsonic speeds, bypass ratios of four or more, namely high bypass ratios, are selected. Because it is expected to improve fuel efficiency as the bypass ratio is increased, engines with bypass ratios that exceeds eight are recently in practical use. In order to minimize energy loss, in a normally selected structure, a bypass duct is shortened to eject the bypass flow directly into the ambient air.

On the other hand in a case where supersonic aviation is attached weight, as it requires high velocity flow, low bypass ratio turbofan engines with bypass ratios of two or less are used. In contrast to those with high bypass ratios, bypass flow is conducted through a relatively long bypass duct to a part just behind a turbine and is mixed there and ejected through a nozzle. More specifically, in general, low bypass ratio turbofan engines have inherent structural differences as compared with those with high bypass ratios apart from a difference in the bypass ratios.

The following documents disclose related arts.

Japanese Unexamined Patent Application Publication No. S54-27613

Japanese Unexamined Patent Application Publication No. 2005-113919

SUMMARY

Reducing a bypass ratio and thereby accelerating bypass flow in a low bypass ratio turbofan engine contributes to improvement in a high-speed aviation ability. However, as the bypass duct is more narrowed and the bypass flow is more accelerated, energy loss in the bypass duct grows larger and it is therefore expected to worsen fuel efficiency. Because a supersonic plane does not have enough room for carrying reserve fuel in general, there is a problem that its cruising distance is inevitably limited at the expense of the fuel inefficiency.

The content of the disclosure herein has been created in view of this problem. According to an aspect, a fairing installed in a bypass duct defined between an outer casing and an inner casing around an axis of a turbofan engine to make compressed air bypass a low pressure compressor is comprised of a fore section elongated aftward from the inner casing at an inlet of the bypass duct and running along an internal periphery of the outer casing; and an aft section elongated aftward in succession to the fore section and curved in a direction getting away from the internal periphery so as to increase an area of a flow path toward an aft end of the aft section, the whole of the aft section being curved.

DETAILED DESCRIPTION OF THE EXEMPLARY EMBODIMENTS

Exemplary embodiments will be described hereinafter with reference to the appended drawings. It is particularly noted that these drawings are not always drawn to scale exactly and therefore dimensional relations among elements are not limited to those shown therein.

Figure 1:
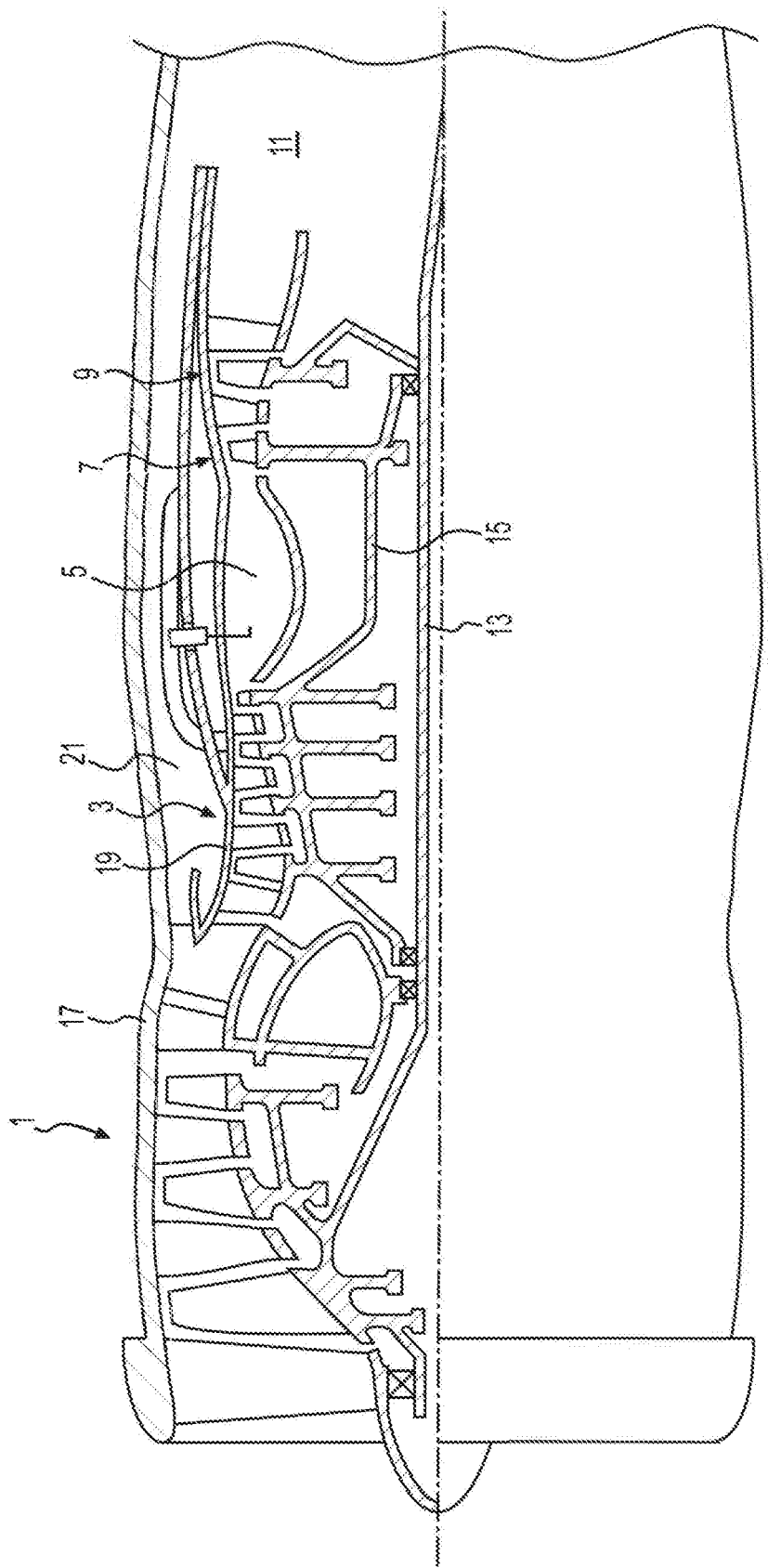
FIG. 1 is an elevational partial sectional view of a low bypass ratio turbofan engine according to an embodiment.
Figure 2:
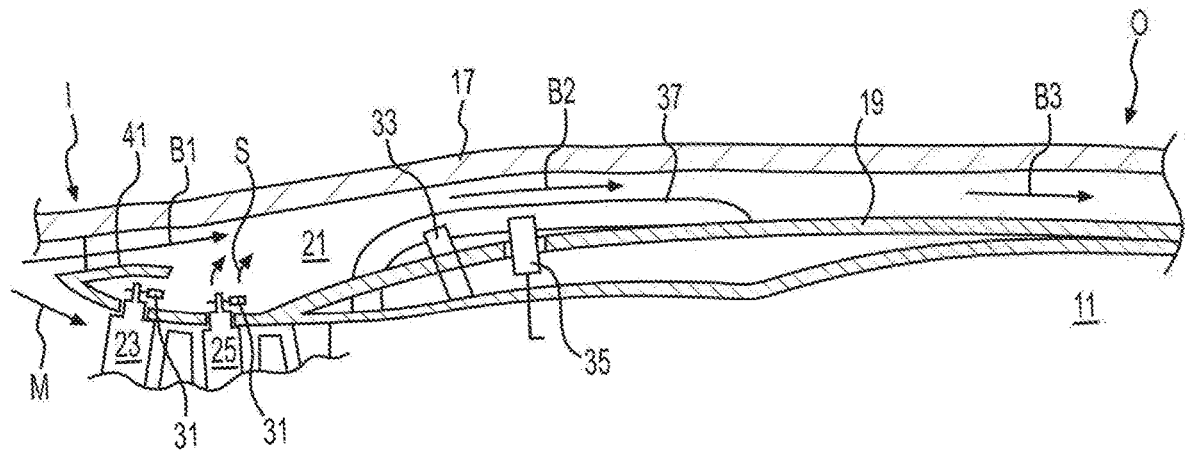
FIG. 2 is an enlarged elevational sectional view mainly showing a bypass duct.

Referring to FIGS. 1 and 2, a low bypass ratio turbofan engine is comprised of a low pressure compressor 1, a high pressure compressor 3, a combustor 5, a high pressure turbine 7, and a low pressure turbine 9, which are arranged in this order from its nose to the tail. The whole thereof is housed in an outer casing 17, and is, aside from the low pressure compressor 1, further housed in an inner casing 19. The outer casing 17 and the inner casing 19 define a bypass duct 21 therebetween, and its inlet I is opened just behind the low pressure compressor 1 and its outlet O is opened at a turbine outlet 11.

Rotor blades of the low pressure turbine 9 and rotor blades of the low pressure compressor 1 are mutually connected via an inner drive shaft 13, which is rotatably supported by the outer casing 17 or the inner casing 19 with having bearings interposed therebetween. Rotor blades of the high pressure turbine 7 and rotor blades of the high pressure compressor 3 are mutually connected via an outer drive shaft 15, which is rotatably supported by the inner drive shaft 13 with having bearings interposed therebetween. They may alternately be supported by the outer casing 17 or the inner casing 19. The inner drive shaft 13 and the outer drive shaft 15 are coaxial and respectively rotatable about the axis of the engine.

Combustion of the fuel in the combustor 5 generates hot gas flow toward the tail. The high pressure turbine 7 extracts part of energy thereof to drive the high pressure compressor 3, and the low pressure turbine 9 extracts the rest of the energy to drive the low pressure compressor 1. The low pressure compressor 1 uses this driving force to compress and eject air aftward.

The compressed air diverges at the inlet I of the bypass duct 21 into a main flow M and a bypass flow B1. The main flow M flows into the high pressure compressor 3 and the high pressure compressor 3 further compresses and supplies it to the combustor 5. The bypass flow B1 makes a detour around the combustor 5 to flow into the bypass duct 21.

The bypass duct 21 is adjacent to the high pressure compressor 3 and the combustor 5 across the inner casing 19. Thus structures for operation thereof, such as a variable device 31 for driving vanes 23, 25, nozzles 33 for supplying the fuel into the combustor 5, igniters 35, and extractor tubes 37 for extracting part of the compressed air for example, are exposed on the outer face of the inner casing 19 toward the bypass duct 21.

In order to rectify the bypass flow B1, a fairing 41 is provided at the inlet I of the bypass duct 21. While each drawing only shows a section of the fairing 41 in a plane through the axis of the engine, the fairing 41 is a body of revolution about the axis. It may be a revolutionary body continuous about the axis but may have some partial cutouts or any structures added thereon.

The fairing 41 extends aftward from the inner casing 19 and runs along an internal periphery of the outer casing 17. The bypass flow B1 is thereby rectified to flow along the internal periphery of the outer casing 17 (bypass flow B2). This prevents fast bypass flow from directly impinging on the aforementioned structures 31, 33, 35 and 37, thereby being helpful in reducing pressure loss.

Figure 3:
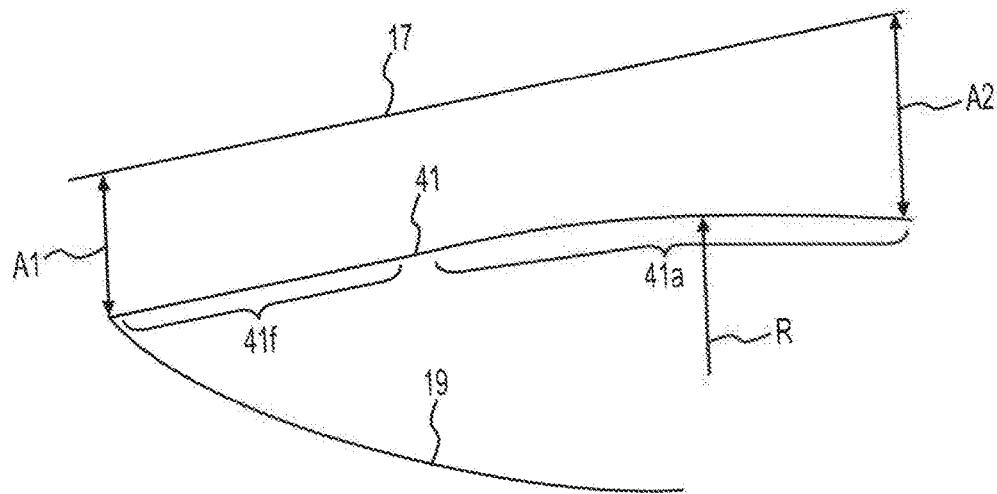
FIG. 3 is an elevational sectional view schematically showing a relation among an outer casing, a fairing and an inner casing.

Referring to FIG. 3 in combination with FIG. 2, the fairing 41, at least a fore section 41f of thereof, may be formed in parallel with the internal periphery of the outer casing 17. Parallelism here is not necessarily strict but they may form an angle of about a few degrees. Either the whole or any part of the fore section 41f may be parallel with the internal periphery. The part in parallel forms a constant sectional area Al and therefore this is not intended to cause reduction in speed and pressure of the bypass flow B1.

The faring fairing 41 gradually increases the area of the flow path toward the rear, thereby having a structure that decelerates the bypass flow B1. An aft section 41a elongated aftward in succession to the fore section 41f curves in a direction getting away from the internal periphery of the outer casing 17. This curve is preferably rendered smooth in view of prevention of creation of air resistance, and may be formed in a shape along an arc. In the case where it's along an arc, this curved section may run along an annular face described by rotating an arc about the axis of the engine. In view of reducing air resistance, it is more advantageous as a radius of curvature R of the curved section comes greater, and thus the radius may be about 1 m for example. The aft section 41a may be totally formed as the curved section but the curved section may be limited to a part thereof. Further, the fore section 41f may be also curved and its radius of curvature may be identical to or different from that of the aft section 41a.

An aft end of the aft section 41a may be terminated midway in the bypass duct 21. The aft section 41a at this aft end may be parallel with the axis of the engine. An area A2 of the flow path, at this aft end, is greater than the area A1 at the inlet, thereby decelerating the bypass flow B1. Although details will be described later, it is noted that a slow air flow S in the bypass duct 21, when mixing with the fast bypass flow, creates resistance and therefore may be a major source for pressure loss. In the present embodiment, as the velocity difference between the bypass flow B1 and the slow air flow S is reduced, the resistance is reduced, thereby decreasing the pressure loss. As an area ratio A2/A1 comes greater, the effect of suppressing pressure loss comes greater, but the effect of improving the high-speed aviation ability becomes less. Therefore the area ratio A2/A1 may be from 1.5 to 2.0.

In regard to the length of the fairing 41, from its fore end to the aft end, an overly short length of course causes reduction of the effects but an overly long length leads to saturation of another effect in view of the action of rectifying the flow. Thus the length from the fore end to the aft end may be in the range of from 0.25 L to 0.5 L, where the total length of the bypass duct 21 (from the inlet I to the outlet O) is L.

Figure 5:
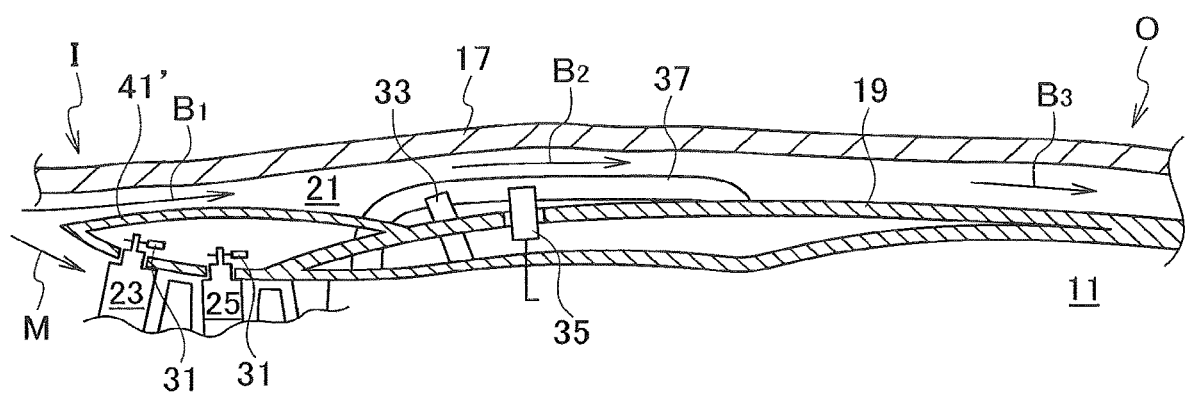
FIG. 5 is an elevational sectional view illustrating a bypass duct according to another embodiment.

Or, the aft section 41a may not terminate midway but may be connected to the inner casing 19 as shown in FIG. 5 so that the fairing 41' covers the structures such as the variable device 31. Further, while FIG. 5 illustrates as if the structures 33, 35 and 37 are exposed to the bypass duct 21, the fairing 41' may be elongated to the outlet of the bypass duct 21 so as to cover these structures. As long as the structures on the outer periphery of the inner casing 19, such as the structures 31, 33, 35 and 37, are covered, they are prevented from causing pressure loss.

The bypass duct 21, at the outlet O, merges with a turbine outlet 11. The bypass flow B3 reaching the outlet O, at the turbine outlet 11, mixes with the hot gas therein and is ejected aftward through an exhaust nozzle that is outside the drawings.

Figure 4:
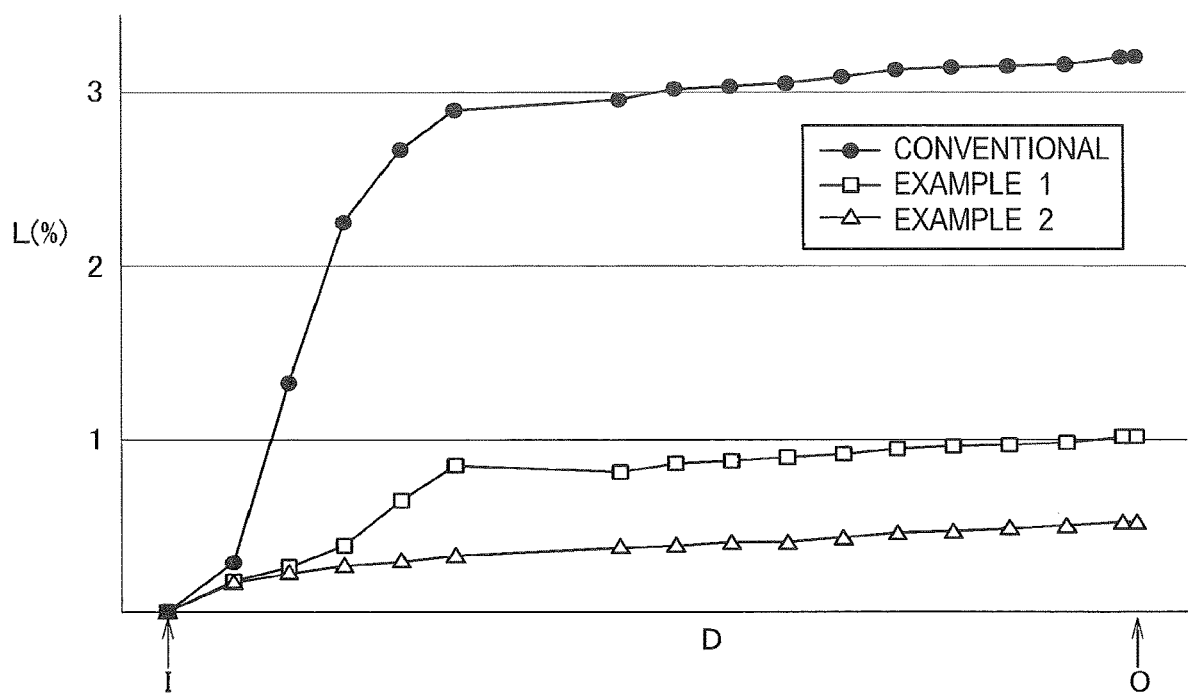
FIG. 4 is a graph showing a distribution of pressure loss.

Effects created by the present embodiment will be described below with reference to FIG. 4. FIG. 4 is an example of CFD analysis results given on a premise in which dimensions and flow rates are those in an actual airplane, where the abscissa axis means an axial distance D based on the inlet I and the ordinate axis means a pressure loss L expressed in percentage. In the conventional example, a straight rectifier plate without any curved section is applied instead of the fairing in the present embodiment. In the example 1, the fairing has a curved rear section in which a radius of curvature is 1 m and its length is 0.25 L in accordance with the present embodiment. In the example 2, the fairing is elongated to cover the structures on the outer periphery of the inner casing.

In the conventional example, a pressure loss close to 3% occurs in the range of 0.3 L from the inlet of the bypass duct. This is mainly caused by that fast bypass flow mixes with slow air flow in the bypass duct. The pressure loss grows greater at the rear thereof and exceeds 3% at the outlet of the bypass duct.

In comparison, in the example 1, the pressure loss is suppressed below 1% in the range of 0.3 L from the inlet of the bypass duct and is about 1% even at the outlet of the bypass duct. More specifically, the pressure loss is reduced down to ⅓ or less as compared with the conventional example. Further the pressure loss is about 0.5% in the example 2 where the fairing is elongated. The pressure loss is further suppressed.

As described above, the effect of suppressing the pressure loss created by the present embodiment is apparent. Conventional general knowledge taught that to rectify the bypass flow to detour the structures in the bypass duct is an important factor for suppressing the pressure loss. In accordance with this notion, a rectifier should be directed to the internal periphery of the outer casing. Contrary to such general knowledge, the present embodiment applies a fairing curved in a direction getting away from the internal periphery of the outer casing and then succeeds in reducing the pressure loss.

As being understood from the graph of the conventional example, the main part of the pressure loss comes from mixing with the slow air flow around the inlet of the bypass duct. The present embodiment has been reached on the basis of the finding of this fact and by employing a structure that slightly decelerates the bypass flow in order to reduce the pressure loss by the mixture.

As the main part of the pressure loss arises around the inlet, it is also proper to have the length of the fairing in the present embodiment to be in the range of 0.25-0.5 L. It is further apparent that the pressure loss would be suppressed if the fairing was elongated up to the total length of the bypass duct.

According to the present embodiment, by reducing the pressure loss, energy in the bypass flow can be effectively used and therefore fuel efficiency is expected to be improved. Or, as the pressure loss is not increased, the bypass duct can be narrowed. This enables further reduction of the bypass flow rate and therefore leads to improvement in a high-speed aviation ability.

Although certain embodiments have been described above, modifications and variations of the embodiments described above will occur to those skilled in the art, in light of the above teachings.

INDUSTRIAL APPLICABILITY

A fairing contributes to reduction in pressure loss in a bypass duct is provided.

The invention claimed is:

1. A fairing installed in a bypass duct defined between an outer casing and an inner casing around an axis of a turbofan engine to make compressed air bypass a low pressure compressor, the fairing comprising:
   a fore section elongated aftward from the inner casing at an inlet of the bypass duct and running along an internal periphery of the outer casing; and
   an aft section elongated aftward in succession to the fore section and curved in a direction getting away from the internal periphery so as to increase an area of a flow path toward an aft end of the aft section,
   wherein the fairing is cantilevered from the inner casing at the fore section and the aft section terminates at a free end where a bypass flow decelerated by the aft section is mixed with an air flow around the inner casing.

2. The fairing of claim 1, wherein the aft section curves along an arc.

3. The fairing of claim 2, wherein the aft section runs along an annular face described by rotating an arc about the axis.

4. The fairing of claim 1, wherein a ratio of the area of the flow path at the aft end to the area of the flow path at the inlet is from 1.5 to 2.0.

5. A turbofan engine comprising the fairing of claim 1.

6. The fairing of claim 1, wherein the fore section is parallel with the internal periphery of the outer casing.

7. The fairing of claim 1, wherein the free end is radially outward of the low pressure compressor with respect to the axis of the turbofan engine.

8. The fairing of claim 1, wherein the turbofan engine includes a combustor and the free end is upstream of the combustor with respect to the axis of the turbofan engine.

9. The fairing of claim 1, wherein the aft section is free of contact from both the inner casing and the outer casing.

* * * * *